INVENTORS.
ROBERT COHEN
WILLIAM A. SHELLY
SAMUEL M. VIDULICH
BY
William C. Cattell
Arnold E. Renner
Ronald W. O'Keefe
ATTORNEYS.

United States Patent Office 3,482,265

Patented Dec. 2, 1969

3,482,265

DATA PROCESSING SYSTEM INCLUDING MEANS FOR AWARDING PRIORITY TO REQUESTS FOR COMMUNICATION

Robert Cohen and William A. Shelly, Phoenix, Ariz., and Samuel M. Vidulich, Syracuse, N.Y., assignors to General Electric Company, a corporation of New York Filed July 22, 1966, Ser. No. 567,221
Int. Cl. G11b *13/00*
U.S. Cl. 340—172.5 13 Claims

ABSTRACT OF THE DISCLOSURE

A data processing system is disclosed incorporating a memory controller acting as the exclusive communications path from the remainder of the data processing system to a memory. The memory controller includes a plurality of bi-stable devices each connected to a different one of the communicating devices and each receiving signals indicating a request for memory access. Upon receipt of the signal, a corresponding bi-stable device assumes a predetermined state. A second plurality of bistable devices are provided, each connected to a corresponding one of the first plurality of bi-stable devices and each connected to receive a status signal for assuming a state in accordance with the connected one of the bistable devices of the first plurality. The second plurality of bi-stable devices are arranged in a predetermined priority arrangement to therefore permit devices to communicate with and gain access to the data processing system memory in an efficient and orderly manner.

INTRODUCTION

The present invention pertains to data processing systems, and more specifically, to those systems utilizing control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful is a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily have much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and is also the means for awarding priority when accesses to memory are requested by more than one subsystem, or when more than one subsystem requests communication with another subsystem.

When requests for access to memory or requests for communication (these requests may be referred to as memory access request signals or channel interrupt signals) with other subsystems are received by the memory controller, a priority arrangement is provided; however, the present invention utilizes a unique signal-receiving scheme wherein requests for communication are stored pending the granting of priority. To provide maximum efficiency for information flow throughout the system, all requests for communication from a subsystem are received by the memory controller and result in the setting of a flip-flop. When the memory controller assumes a "not busy" condition, indications of requests for communication from subsystems stored in the flip-flops are transferred to a second arrangement of flip-flops the outputs of which are connected in a predetermined priority order. The flip-flops to first receive communication requests are then reset and are available to receive additional requests from the same communicating devices or subsystems. The transfer of information requests from one series of flip-flops to a second enables an orderly priority arrangement to be implemented while nevertheless always permitting the receipt of communication request signals and storage of their receipt.

It is therefore an object of the present invention to provide a data processing system including means for efficiently awarding priority of communication among the subsystems thereof.

It is another object of the present invention to provide a data processing system including a memory controller connected to receive and transmit data and instructions throughout the system.

It is another object of the present invention to provide a data processing system utilizing a memory controller having means for receiving and storing requests for communication with memory and other subsystems.

It is still another object of the present invention to provide a data processing system utilizing a memory controller having a first arrangement of bistable devices for storing indications of requests for communication and for transferring these indications to a second arrangement of bistable devices to permit the first arrangement of bistable devices to receive additional requests.

It is still another object of the present invention to provide a data processing system wherein a memory controller is utilized to control system communication and wherein requests for information are serviced in accordance with a predetermined priority under the control of conditions scrutinized by the memory controller.

These and other objects and advantages of the present invention will become apparent to those skilled in the art as the description of the invention proceeds.

Certain portions of the apparatus herein disclosed are not of our invention, but are the inventions of:

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
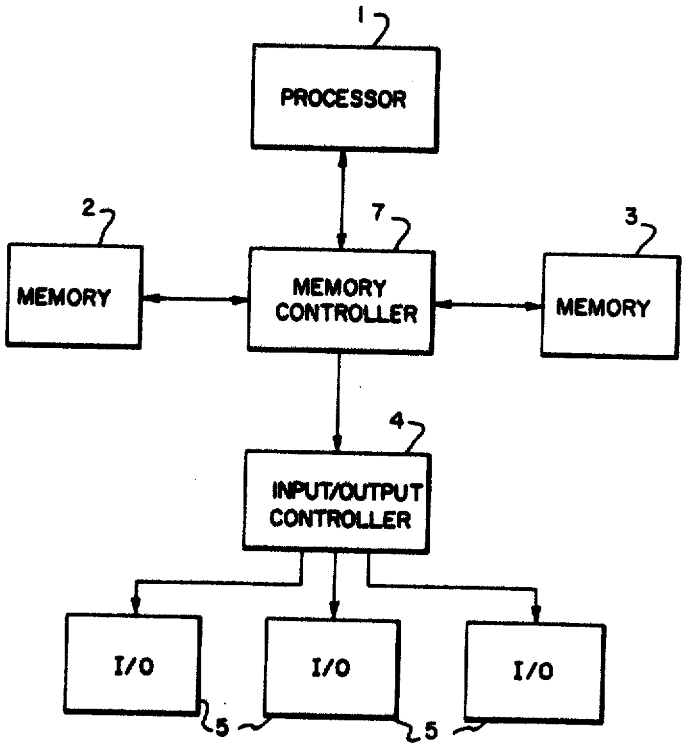
FIGURE 1 is a block diagram of a data processing system in a single memory controller configuration.

For a complete description of the system of FIGURE 1 and of my invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42 inclusive of United States Patent No. 3,413,613 which are incorporated herein by reference and made a part hereof.

What is claimed is:

1. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of storage devices each connected to receive memory access request signals from a different one of said communicating devices and each responsive to the receipt of a memory access request signal for assuming a storage condition, a status signal generating means for generating a not busy signal in response to predetermined memory controller conditions, a second plurality of storage devices connected to said status signal generating means and each connected to a different one of said first plurality of storage devices, each of said second plurality of storage devices responsive to the simultaneous occurrence of said not busy signal and a storage condition of a connected one of said first plurality of storage devices for assuming a storage condition.

2. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of storage devices each connected to receive memory access request signals from a different one of said communicating devices and each responsive to the receipt of a memory access request signal for assuming a storage condition, a status signal generating means for generating a not busy signal in response to predetermined memory controller conditions, a second plurality of storage devices connected to said status signal generating means and each connected to a different one of said first plurality of storage devices, each of said second plurality of storage devices responsive to the simultaneous occurrence of said not busy signal and a storage condition of a connected one of said first plurality of storage devices for assuming a storage condition; said memory controller also including means for resetting each of said first plurality of storage devices when the connected one of said second plurality of storage devices assumes a storage condition.

3. In a data processing system: a memory device for storing data and instructions; a plurality of communicating devices each requiring access to said memory device and each including means for generating memory access request signals; a memory controller connected to soid memory device and connected to said communicating devices for controlling access to said memory device, said memory controller including: a first plurality of multistable devices each connected to receive memory access request signals from a different one of said communicating devices and each responsive to the receipt of a memory access request signal for assuming a given stable state, a status signal generating means for generating a not busy signal in response to predetermined memory controller conditions, a second plurality of multistable devices each connected to said status signal generating means and connected to a different one of said first plurality of multistable devices, each of said second plurality of multistable devices responsive to the simultaneous occurrence of said not busy signal and a given stable state of a connected one of said first plurality of multistable devices for assuming a given stable state.

4. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of multistable devices each connected to receive memory access request signals from a different one of said communicating devices and each responsive to the receipt of a memory access request signal for assuming a given stable state, a status signal generating means for generating a not busy signal in response to predetermined memory controller conditions, a second plurality of multistable devices connected to said status signal generating means each connected to a different one of said first plurality of multistable devices, each of said second plurality of multistable devices responsive to the simultaneous occurrence of said not busy signal and a given stable state of a connected one of said first plurality of multistable devices for assuming a given stable state; said memory controller also including means for resetting each of said first plurality of multistable devices when the connected one of said second plurality of multistable devices assumes a given stable state.

5. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of multistable devices each connected to receive memory access request signals from a different one of said communicating devices and each responsive to the receipt of a memory access request signal for assuming a given stable state, a status signal generating means comprising a bistable device for generating a not busy signal in response to predetermined memory controller conditions, a second plurality of multistable devices connected to said status signal generating means each connected to a different one of said first plurality of multistable devices, each of said second plurality of multistable devices responsive to the simultaneous occurrence of said not busy signal and a given stable state of a connected one of said first plurality of multistable devices for assuming a given stable state.

6. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of multistable devices each connected to receive memory access request signals from a different one of said communicating devices and each responsive to the receipt of a memory access request signal for assuming a given stable state, a status signal generating means comprising a bistable device for generating a not busy signal in response to predetermined memory controller conditions, a second plurality of multistable devices each connected to said status signal generating means connected to a different one of said first plurality of multistable devices, each of said second plurality of multistable devices responsive to the simultaneous occurrence of said not busy signal and a given stable state of a connected one of said first plurality of multistable devices for assuming a given stable state; said memory controller also including means for resetting each of said first plurality of multistable devices when the connected one of said second plurality of multistable devices assumes a given stable state.

7. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of bistable devices each connected to receive memory access request signals from a different one of said communicating devices and each responsive to the receipt of a memory access request signal for assuming a given stable state, a status signal generating means comprising a bistable device for generating a not busy signal in response to predetermined memory controller conditions, a second plurality of bistable devices connected to said status signal generating means each connected to a different one of said first plurality of bistable devices, each of said second plurality of bistable devices responsive to the simultaneous occurrence of said not busy signal and a given stable state of a connected one of said first plurality of bistable devices for assuming a given stable state.

8. In a data processing system: a memory device for storing data and instructions; a plurality of communicating devices each requiring access to said memory device and each including means for generating memory access request signals; a memory controller connected to said memory device and connected to said communicating devices for controlling access to said memory device, said memory controller including: a first plurality of bistable devices each connected to receive memory access request signals from a different one of said communicating devices and each responsive to the receipt of a memory access request signal for assuming a given stable state, a status signal generating means comprising a bistable device for generating a not busy signal in response to predetermined memory controller conditions, a second plurality of bistable devices connected to said status signal generating means each connected to a different one of said first plurality of bistable devices, each of said second plurality of bistable devices responsive to the simultaneous occurrence of said not busy signal and a given stable state of a connected one of said first plurality of bistable devices for assuming a given stable state; said memory controller also including means for resetting each of said first plurality of bistable devices when the connected one of said second plurality of bistable devices assumes a given stable state.

9. In a data processing system: a memory device for storing data and instructions; a data processing system including a plurality of communicating devices each requiring communication with other communicating devices and with said memory device and having means for generating communication request signals; a memory controller connected to said memory device and connected to said communicating devices for controlling communication among said devices, said memory controller including: a first plurality of storage devices each connected to receive communication request signals from a different one of said communicating devices and each responsive to the receipt of a communication request signal for assuming a storage condition; a status signal generating means for generating a not busy signal in response to predetermined memory controller conditions, a second plurality of storage devices connected to said status signal generating means each connected to a different one of said first plurality of storage devices, each of said second plurality of storage devices responsive to the simultaneous occurrence of said not busy signal and a storage condition of a connected one of said first plurality of storage devices for assuming a storage condition.

10. In a data processing system: a memory device for storing data and instructions; a data processing system including a plurality of communicating devices each requiring communication with other communicating devices and with said memory device and having means for generating communication request signals; a memory controller connected to said memory device and connected to said communicating devices for controlling communication among said devices, said memory controller including: a first plurality of storage devices each connected to receive communication request signals from a different one of said communicating devices and each responsive to the receipt of a communication request signal for assuming a storage condition; a status signal generating means for generating a not busy signal in response to predetermined memory controller conditions, a second plurality of storage devices connected to said status signal generating means each connected to a different one of said first plurality of storage devices, each of said second plurality of storage devices responsive to the simultaneous occurrence of said not busy signal and a storage condition of a connected one of said first plurality of storage devices for assuming a storage condition; said memory controller also including means for resetting each of said first plurality of storage devices when the connected one of said second plurality of storage devices assumes a storage condition.

11. In a data processing system: a memory device for storing data and instructions; a data processing system including a plurality of communicating devices each requiring communication with other communicating devices and with said memory device and having means for generating communication request signals; a memory controller connected to said memory device and connected to said communicating devices for controlling communication among said devices, said memory controller including: a first plurality of multistable devices each connected to receive communication request signals from a different one of said communicating devices and each responsive to the receipt of a communication request signal for assuming a given stable state, a status signal generating means for generating a not busy signal in response to predetermined memory controller conditions, a second plurality of multistable devices connected to said status signal generating means each connected to a different one of said first plurality of multistable devices, each of said second plurality of multistable devices responsive to the simultaneous occurrence of said not busy signal and a given stable state of a connected one of said first plurality of multistable devices for assuming a given stable state; said memory controller also including means for resetting each of said first plurality of multistable devices when the connected one of said second plurality of multistable devices assumes a given stable state.

12. In a data processing system: a memory device for storing data and instructions; a data processing system including a plurality of communicating devices each requiring communication with other communicating devices and with said memory device and having means for generating communication request signals; a memory controller connected to said memory device and connected to said communicating devices for controlling communication among said devices, said memory controller including: a first plurality of bistable devices each connected to receive communication request signals from a different one of said communicating devices and each responsive to the receipt of a communication request signal for assuming a given stable state, a status signal generating means comprising a bistable device for generating a not busy signal in response to predetermined memory controller conditions, a second plurality of bistable devices connected to said status signal generating means each connected to a different one of said first plurality of bistable devices, each of said second plurality of bistable devices responsive to the simultaneous occurrence of said not busy signal and a given stable state of a connected one of said first plurality of bistable devices for assuming a given stable state.

13. In a data processing system: a memory device for storing data and instructions; a data processing system including a plurality of communicating devices each requiring communication with other communicating devices and with said memory device and having means for generating communication request signals; a memory controller connected to said memory device and connected to said communicating devices for controlling communication among said devices, said memory controller including: a first plurality of bistable devices each connected to receive communication request signals from a different one of said communicating devices and each responsive to the receipt of a communication request signal for assuming a given stable state, a status signal generating means comprising a bistable device for generating a not busy signal in response to predetermined memory controller conditions, a second plurality of bistable devices connected to said status signal generating means each connected to a different one of said first plurality of bistable devices, each of said second plurality of bistable devices responsive to the simultaneous occurrence of said not busy signal and a given stable state of a connected one of said first plurality of bistable devices for assuming a given stable state; said memory controller also including means for resetting each of said first plurality of bistable devices when the connected one of said second plurality of bistable devices assumes a given stable state.

References Cited

UNITED STATES PATENTS

| | | | |
|---|---|---|---|
| 3,377,621 | 4/1968 | Hittel et al. | 340—172.5 |
| 3,222,647 | 12/1965 | Strachey | 340—172.5 |
| 3,239,819 | 3/1966 | Masters | 340—172.5 |
| 3,298,001 | 1/1967 | Couleur et al. | 340—172.5 |

RAULFE B. ZACHE, Primary Examiner